(12) United States Patent
Mizutani (10) Patent No.: US 12,117,959 B2
(45) Date of Patent: Oct. 15, 2024

(54) COMMUNICATION APPARATUS AND COMMUNICATION SYSTEM

(71) Applicant: Sony Semiconductor Solutions Corporation, Kanagawa (JP)

(72) Inventor: Yuichi Mizutani, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/776,055

(22) PCT Filed: Dec. 4, 2020

(86) PCT No.: PCT/JP2020/045349
§ 371 (c)(1),
(2) Date: May 11, 2022

(87) PCT Pub. No.: WO2021/117646
PCT Pub. Date: Jun. 17, 2021

(65) Prior Publication Data
US 2022/0391346 A1     Dec. 8, 2022

(30) Foreign Application Priority Data
Dec. 12, 2019   (JP) .................................. 2019-224480

(51) Int. Cl.
*G06F 13/42*      (2006.01)
(52) U.S. Cl.
CPC ................................ *G06F 13/4282* (2013.01)
(58) Field of Classification Search
CPC ..................................................... G06F 13/24
See application file for complete search history.

(56) References Cited

U.S. PATENT DOCUMENTS

2019/0138490 A1*   5/2019   Srivastava ........... G06F 13/1673
2022/0391346 A1*   12/2022   Mizutani ............. G06F 13/4291

FOREIGN PATENT DOCUMENTS

| JP | 2000285070 A | 10/2000 |
| JP | 2004348580 A | 12/2004 |
| JP | 2008269626 A | 11/2008 |
| JP | 2012008982 A | 1/2012 |
| JP | 2016528588 A | 9/2016 |
| JP | 2016218943 A | 12/2016 |
| WO | 2017/061330 A1 | 4/2017 |

OTHER PUBLICATIONS

International Search Report (PCT/ISA/210), International Application No. PCT/JP2020/045349, dated Feb. 16, 2021.

* cited by examiner

*Primary Examiner* — Henry Tsai
*Assistant Examiner* — Juanito C Borromeo
(74) *Attorney, Agent, or Firm* — Michael Best & Friedrich LLP (57) ABSTRACT

A communication apparatus includes an $I^2C$ logic circuit, an I3C logic circuit, an external terminal, and a switch circuit. The $I^2C$ logic circuit controls communication via a control data bus in accordance with an $I^2C$ (Inter?Integrated Circuit) communication standard. The I3C logic circuit controls the communication via the control data bus in accordance with an I3C (Improved Inter Integrated Circuit) communication standard. The external terminal is coupled to the control data bus. The switch circuit controls coupling between one of the $I^2C$ logic circuit and the I3C logic circuit, and the external terminal.

14 Claims, 6 Drawing Sheets

|  |  |  | I3C | I3C+I2C | I2C |
|---|---|---|---|---|---|
| PROCESS UPON POWER ON | IO POWER SOURCE I2C LOGIC POWER SOURCE I3C LOGIC POWER SOURCE | | on | on | on |
| PROCESS AFTER POWER ON | SWITCHING SYSTEM | | NVM,Reg | NVM,Reg | — |
|  | PROCESS AFTER SWITCHING | I/O CIRCUIT | Push/Pull OpenDrain | Push/Pull OpenDrain | OpenDrain |
|  |  | NOISE FILTER | off | off | on |
|  |  | I2C LOGIC | off | off⇔on | on |
|  |  | I3C LOGIC | on | on⇔off | off |

[FIG. 6]

COMMUNICATION APPARATUS AND COMMUNICATION SYSTEM

TECHNICAL FIELD

The present disclosure relates to a communication apparatus and a communication system.

BACKGROUND ART

As a bus IF (Interface) used for communication in a board with a plurality of devices being mounted thereon, for example, I²C (Inter-Integrated Circuit) has often been used. Further, recently, an increase in speed of I²C has been demanded, and I3C (Improved Inter Integrated Circuit) specification has been progressing as a next-generation standard. A communication system using I3C is disclosed in, for example, PTL 1.

CITATION LIST

Patent Literature

PTL 1: International Publication No, WO2017/061330

SUMMARY OF THE INVENTION

Because I²C is currently the mainstream in communication systems, it is expected that a communication system using both I²C and I3C will be used for some time. In such a communication system in which such two standards coexist, it is expected that space saving is required. Therefore, it is desirable to provide a communication apparatus and a communication system that achieve space saving in a communication system using both I²C and I3C.

A communication apparatus according to one aspect of the present disclosure includes an I²C logic circuit, an I3C logic circuit, an external terminal, and a switch circuit. The I²C logic circuit controls communication via a control data bus in accordance with an I²C communication standard. The I3C logic circuit controls the communication via the control data bus in accordance with an I3C communication standard. The external terminal is coupled to the control data bus. The switch circuit controls coupling between one of the I²C logic circuit and the I3C logic circuit, and the external terminal.

A communication system according to one aspect of the present disclosure includes a control data bus, a transmission apparatus, and a reception apparatus. The transmission apparatus and the reception apparatus perform communication via the control data bus. The transmission apparatus includes an I²C logic circuit, an I3C logic circuit, an external terminal, and a switch circuit. The I²C logic circuit controls communication with the reception apparatus via the control data bus in accordance with an I²C communication standard. The I3C logic circuit controls the communication with the reception apparatus via the control data bus in accordance with an I3C communication standard. The external terminal is coupled to the control data bus. The switch circuit controls coupling between one of the I²C logic circuit and the I3C logic circuit, and the external terminal.

In the transmission apparatus according to one aspect of the present disclosure and the communication system according to one aspect of the present disclosure, the I²C logic circuit and the I3C logic circuit are provided, and the switch circuit that controls the coupling between one of the I²C logic circuit and the I3C logic circuit, and the external terminal is provided. Accordingly, the number of external terminals is reduced, as compared with a case where an external terminal is provided for each of the I²C logic circuit and the I3C logic circuit.

MODES FOR CARRYING OUT THE INVENTION

1. Embodiment

Some embodiments of the present disclosure are described below in detail with reference to the drawings. The following description is a specific example of the present disclosure, and the present disclosure is not limited to the following embodiments.

Figure 1:
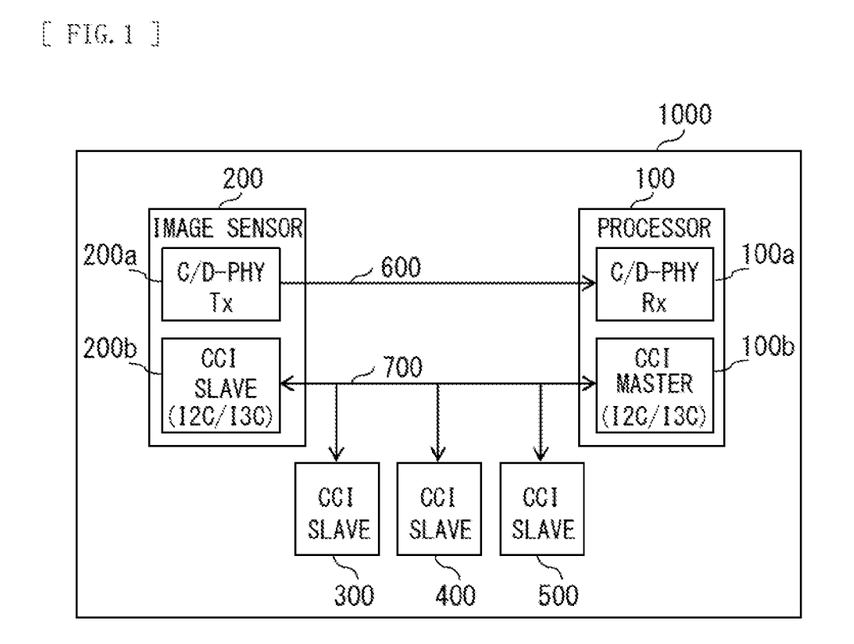
FIG. 1 is a diagram illustrating a schematic configuration example of a communication system.

FIG. 1 illustrates a schematic configuration example of a communication system 1000 according to an embodiment of the present disclosure. The communication system 1000 is applicable to a system equipped with a camera device. For example, the communication system 1000 is applicable to a monitoring camera (e.g., a home security system), an industrial apparatus (e.g., an apparatus with a failure detection function using a camera), a robotic apparatus (e.g., a drone equipped with a camera), a mobile apparatus (e.g., a smartphone equipped with a camera), or the like. The communication system 1000 includes an image data bus 600 and a control data bus 700. The image data bus 600 and the control data bus 700 may be mounted between or inside devices in the communication system 1000. The communication system 1000 is, for example, a camera device. The image data bus 600 and the control data bus 700 are mounted inside the camera device and coupled to an image sensor 200 and a processor 100. The control data bus 700 may be further coupled to a plurality of slaves 300, 400, and 500.

In FIG. 1, image data may be transmitted from a transmitter 200*a* of the image sensor 200 to a receiver 100*a* of the processor 100 via the image data bus 600 of C-PHY or D-PHY defined by MIPI (i.e., high-speed differential link). The control data bus 700 includes three wiring lines that are configurable to operate in accordance with either of the I²C and I3C communication standards. Accordingly, the control data bus 700 includes a clock line SCL, a data line SDA, and an input/output line GPIO (General-purpose input/output) as the three wiring lines. The data line SDA may carry image data from a slave 200*b* of the image sensor 200 to a master 100*b* of the processor 100 in accordance with one of the I²C and I3C communication standards. The clock line SCL may carry a clock signal that is used to synchronize data transfers via the control data bus 700 in accordance with one of the $I^2C$ and I3C communication standards. The input/output line GPIO may carry a control signal used to utilize a function of $I^2C$. The control data bus 700 may be configured to couple the master 100b and the four slaves 200b, 300, 400, and 500 via the three wiring lines (the clock line SCL, the data line SDA, and the input/output line GPIO).

As illustrated in FIG. 1, the processor 100 includes the receiver 100a and the master 100b. The receiver 100a includes, for example, one or more processors, various processing circuits, and the like each including an arithmetic circuit such as an MPU (Micro Processing Unit). The master 100b includes, for example, one or more processors, various processing circuits, and the like each including an arithmetic circuit such as an MPU. The master 100b corresponds to a specific example of a "reception apparatus" or a "master" of the present disclosure.

As illustrated in FIG. 1, the image sensor 200 includes the transmitter 200a and the slave 200b. The transmitter 200a includes, for example, one or more processors, various processing circuits, and the like each including an arithmetic circuit such as an MPU. The slave 200b includes, for example, one or more processors, various processing circuits, and the like each including an arithmetic circuit such as an MPU. The slave 200b corresponds to a specific example of a "communication apparatus" or a "transmission apparatus" of the present disclosure.

The image sensor 200 includes, for example, an imaging unit that acquires image data by imaging. For example, the imaging unit converts an optical image signal obtained through an optical lens or the like into image data. The imaging unit includes, for example, a CCD (Charge Coupled Device) image sensor or a CMOS (Complementary Metal Oxide Semiconductor) image sensor. The imaging unit has an analog-to-digital conversion circuit, and converts analog image data into digital image data. The imaging unit acquires image data A by imaging, and supplies the acquired image data to the transmitter 200a or the slave 200b.

The clock line SCL, the data line SDA, and the input/output line GPIO are used to transmit a signal between the master 100b and the slave 200b. For example, serial data is sequentially transmitted bit by bit via the data line SDA, and a serial clock of a predetermined frequency is transmitted via the clock line SCL. With the control data bus 700, the master 100b is able to transmit data simultaneously to all of the slaves 200b, 300, 400, and 500, or is able to transmit data individually by specifying each of the slaves 200b, 300, 400, and 500 with an address. Further, with the control data bus 700, the slave 200b is able to transmit data simultaneously to all of the master 100b and the slaves 300, 400, and 500 or is able to transmit data individually by specifying each of the master 100b and the slaves 300, 400, and 500 with an address.

Figure 2:
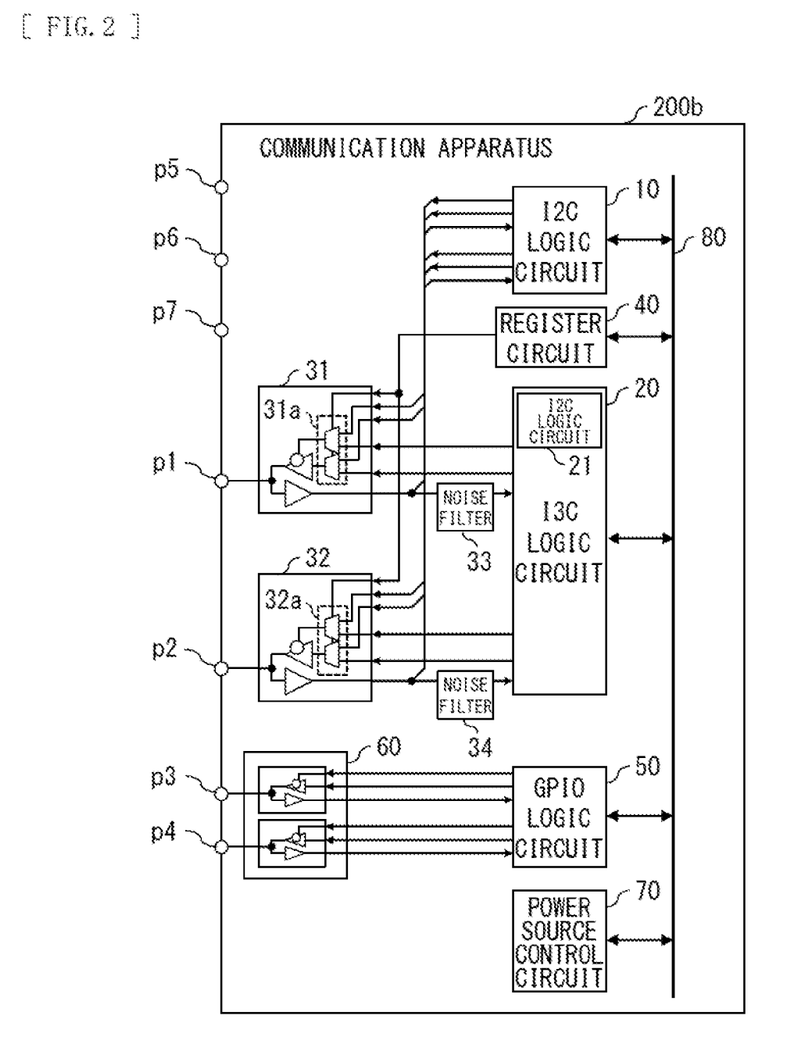
FIG. 2 is a diagram illustrating an example of a schematic configuration of a slave provided in an image sensor in FIG. 1.

Next, a schematic configuration of the slave 200b is described. FIG. 2 illustrates a schematic configuration example of the slave 200b. For example, as illustrated in FIG. 2, the slave 200b includes an $I^2C$ logic circuit 10, an I3C logic circuit 20, I/O circuits 31 and 32, noise filters 33 and 34, a register circuit 40, a GPIO logic circuit 50, an I/O circuit 60, and a power source control circuit 70. For example, as illustrated in FIG. 2, the slave 200b further includes a bus 80. The $I^2C$ logic circuit 10, the I3C logic circuit 20, the register circuit 40, the GPIO logic circuit 50, and the power source control circuit 70 are coupled to the bus 80. The bus 80 is, for example, an on-chip bus such as an AMBA (Advanced Microcontroller Bus Architecture). Note that an input end of an SCL terminal p1 and SDA terminal p2 side of the $I^2C$ logic circuit 10 is provided with a noise filter having a function similar to that of the noise filters 33 and 34 provided on an input end of an SCL terminal p1 and SDA terminal p2 side of the I3C logic circuit 20. However, in FIG. 2, illustration of the noise filter provided on the input end of the SCL terminal p1 and SDA terminal p2 side of the $I^2C$ logic circuit 10 is omitted.

The $I^2C$ logic circuit 10 corresponds to a specific example of an "$I^2C$ logic circuit" of the present disclosure. The I3C logic circuit 20 corresponds to a specific example of an "I3C logic circuit" of the present disclosure. The noise filters 33 and 34 correspond to a specific example of a "noise filter" of the present disclosure. The register circuit 40 corresponds to a specific example of a "register" of the present disclosure.

The slave 200b further includes a plurality of external terminals. As the plurality of external terminals, the slave 200b includes, for example, the SCL terminal p1, the SDA terminal p2, GPIO terminals p3 and p4, an I/O power supply terminal p5, and logic power supply terminals p6 and p7. The SCL terminal p1, the SDA terminal p2, and the GPIO terminals p3 and p4 correspond to a specific example of an "external terminal" of the present disclosure. The SCL terminal p1 is coupled to the clock line SCL, the SDA terminal p2 is coupled to the data line SDA, and the GPIO terminals p3 and p4 are coupled to the input/output line GPIO. The I/O power supply terminal p5 is a terminal for supplying electric power to the I/O circuits 31, 32, and 60, and is coupled to the I/O circuits 31, 32, and 60. The logic power supply terminal p6 is a terminal for supplying electric power to the $I^2C$ logic circuit 10, the I3C logic circuit 20, and the GPIO logic circuit 50, and is coupled to the $I^2C$ logic circuit 10, the I3C logic circuit 20, and the GPIO logic circuit 50. The logic power supply terminal p7 is a terminal for supplying electric power to another unillustrated logic circuit, and is coupled to the other unillustrated logic circuit.

The $I^2C$ logic circuit 10 controls communication via the control data bus 700 in accordance with the $I^2C$ communication standard. For example, the $I^2C$ logic circuit 10 generates a signal corresponding to the $I^2C$ communication standard on the basis of a signal received via the bus 80, and supplies it to the I/O circuits 31 and 32. In addition, the $I^2C$ logic circuit 10 performs a predetermined process on a signal corresponding to the $I^2C$ communication standard supplied from the SCL terminal p1 and the SDA terminal p2, and supplies the signal obtained thereby to a predetermined device via the bus 80.

The I3C logic circuit 20 controls communication via the control data bus 700 in accordance with the I3C communication standard. For example, the I3C logic circuit 20 generates a signal corresponding to the I3C communication standard on the basis of a signal received via the bus 80, and supplies it to the I/O circuits 31 and 32. In addition, the I3C logic circuit 20 performs a predetermined process on a signal corresponding to the I3C communication standard supplied from the SCL terminal p1 and the SDA terminal p2, and supplies the signal obtained thereby to a predetermined device via the bus 80. In addition, the I3C logic circuit 20 employs an open-drain configuration upon the $I^2C$ sequence and employs a push-pull configuration upon the I3C sequence.

The I/O circuit 31 includes a switch circuit 31a. The switch circuit 31a corresponds to a specific example of a "switch circuit" of the present disclosure. The switch circuit 31a controls coupling between one of the $I^2C$ logic circuit 10 and the I3C logic circuit 20, and the SCL terminal p1. For example, the switch circuit 31a controls the above-described coupling on the basis of a stale value (a Reg value) obtained from the register circuit 40. In addition, for example, the switch circuit 31a controls the above-described coupling when an ACK from the master 100b is confirmed upon the I²C sequence. In addition, for example, the switch circuit 31a controls the above-described coupling when a Stop condition (SCL=H, SDA=L→H) from the master 100b is confirmed.

For example, the switch circuit 31a supplies one of the signal of the I²C logic circuit 10 and the signal of the I3C logic circuit 20 to the SCL terminal p1 on the basis of the state value (the Reg value) obtained from the register circuit 40. At this time, the state value may be, for example, a flag indicating execution of the I²C sequence (hereinafter, referred to as a "flag A") and a flag indicating execution of the I3C sequence (hereinafter, referred to as a "flag B"). In a case where the state value is the flag A, the switch circuit 31a supplies the signal of the I²C logic circuit 10 to the SCL terminal p1. In a case where the state value is the flag B, the switch circuit 31a supplies the signal of the I3C logic circuit 20 to the SCL terminal p1. The I/O circuit 31 further includes, for example, a circuit that supplies the signal supplied to the SCL terminal p1 to the I²C logic circuit 10 and supplies it to the I3C logic circuit 20 via the noise filter 33.

The I/O circuit 32 includes a switch circuit 32a. The switch circuit 32a corresponds to a specific example of a "switch circuit" of the present disclosure. The switch circuit 32a controls coupling between one of the I²C logic circuit 10 and the I3C logic circuit 20, and the SDA terminal p2. For example, the switch circuit 32a controls the above-described coupling on the basis of the state value obtained from the register circuit 40. In addition, for example, the switch circuit 32a controls the above-described coupling when the ACK from the master 100b is confirmed upon the I²C sequence. In addition, for example, the switch circuit 32a controls the above-described coupling when the Stop condition from the master 100b is confirmed.

For example, the switch circuit 32a supplies one of the signal of the I²C logic circuit 10 and the signal of the I3C logic circuit 20 to the SDA terminal p2 on the basis of the state value obtained from the register circuit 40. At this time, in a case where the state value is the flag A, the switch circuit 32a supplies the signal of the I²C logic circuit 10 to the SDA terminal p2. In a case where the state value is the flag B, the switch circuit 32a supplies the signal of the I3C logic circuit 20 to the SDA terminal p2. The I/O circuit 32 further includes, for example, a circuit that supplies the signal supplied to the SDA terminal p2 to the I²C logic circuit 10 and supplies it to the I3C logic circuit 20 via the noise filter 34.

The noise filter 33 is provided between the SCL terminal p1 and the I3C logic circuit 20. The noise filter 33 is a digital filter that processes a signal from the I/O circuit 31 on the basis of the state value obtained from the register circuit 40. In a case where the state value is the flag A, the noise filter 33 performs a predetermined filtering process on the signal from the I/O circuit 31. That is, in this case, a digital filter of the noise filter 33 is turned on. In a case where the state value is the flag B, the noise filter 33 does not perform the filtering process on the signal from the I/O circuit 31, and outputs the signal from the I/O circuit 31 as it is to the I²C logic circuit 10. That is, in this case, the digital filter of the noise filter 33 is turned off.

The noise filter 34 is provided between the SDA terminal p2 and the I3C logic circuit 20. The noise filter 34 is a digital filter that processes a signal from the I/O circuit 32 on the basis of the state value obtained from the register circuit 40. In a case where the state value is the flag A, the noise filter 34 performs a predetermined filtering process on the signal from the I/O circuit 32. That is, in this case, a digital filter of the noise filter 34 is turned on. In a case where the state value is the flag B, the noise filter 34 does not perform the filtering process on the signal from the I/O circuit 32, and outputs the signal from the I/O circuit 32 as it is to the I3C logic circuit 20. That is, in this case, the digital filter of the noise filter 34 is turned off.

The register circuit 40 stores, for example, the above-described state value in a predetermined bit.

The GPIO logic circuit 50 generates a signal corresponding to the function of the I²C on the basis of the signal supplied via the bus 80, and outputs it to the GPIO terminals p3 and p4. In addition, the GPIO logic circuit 50 performs a predetermined process on the signal corresponding to the function of the I²C supplied from the GPIO terminals p3 and p4, and supplies the signal obtained thereby to a predetermined device via the bus 80.

The I/O circuit 60 includes a circuit that supplies a signal from the GPIO logic circuit 50 to the GPIO terminals p3 and p4. In addition, the I/O circuit 60 includes a circuit that supplies the signal supplied to the GPIO terminals p3 and p4 to the GPIO logic circuit 50.

The power source control circuit 70 controls electric power supplied to the I²C logic circuit 10 and the DC logic circuit 20. For example, the power source control circuit 70 controls the electric power supplied to the I²C logic circuit 10 and the I3C logic circuit 20 on the basis of the above-described state value. For example, when a predetermined signal is supplied to the bus 80, the power source control circuit 70 starts supplying electric power to the I²C logic circuit 10, the I3C logic circuit 20, the I/O circuits 31 and 32, the GPIO logic circuit 50, and the I/O circuit 60 (power on). For example, when the I²C sequence starts, the power source control circuit 70 supplies electric power to the I²C logic circuit 10 and stops supplying electric power to the I3C logic circuit 20. For example, when the I3C sequence starts, the power source control circuit 70 supplies electric power to the I3C logic circuit 20 and stops supplying electric power to the I²C logic circuit 10 (power off).

Instead of stopping power supply to the I3C logic circuit 20, the power source control circuit 70 may execute the following operation. For example, the power source control circuit 70 may decrease a clock frequency of the I3C logic circuit 20 or decrease a power supply voltage supplied to the I3C logic circuit 20. Instead of stopping power supply to the I²C logic circuit 10, the power source control circuit 70 may execute the following operation. For example, the power source control circuit 70 may decrease a clock frequency of the I²C logic circuit 10 or decrease a power supply voltage supplied to the I²C logic circuit 10.

Figure 3:
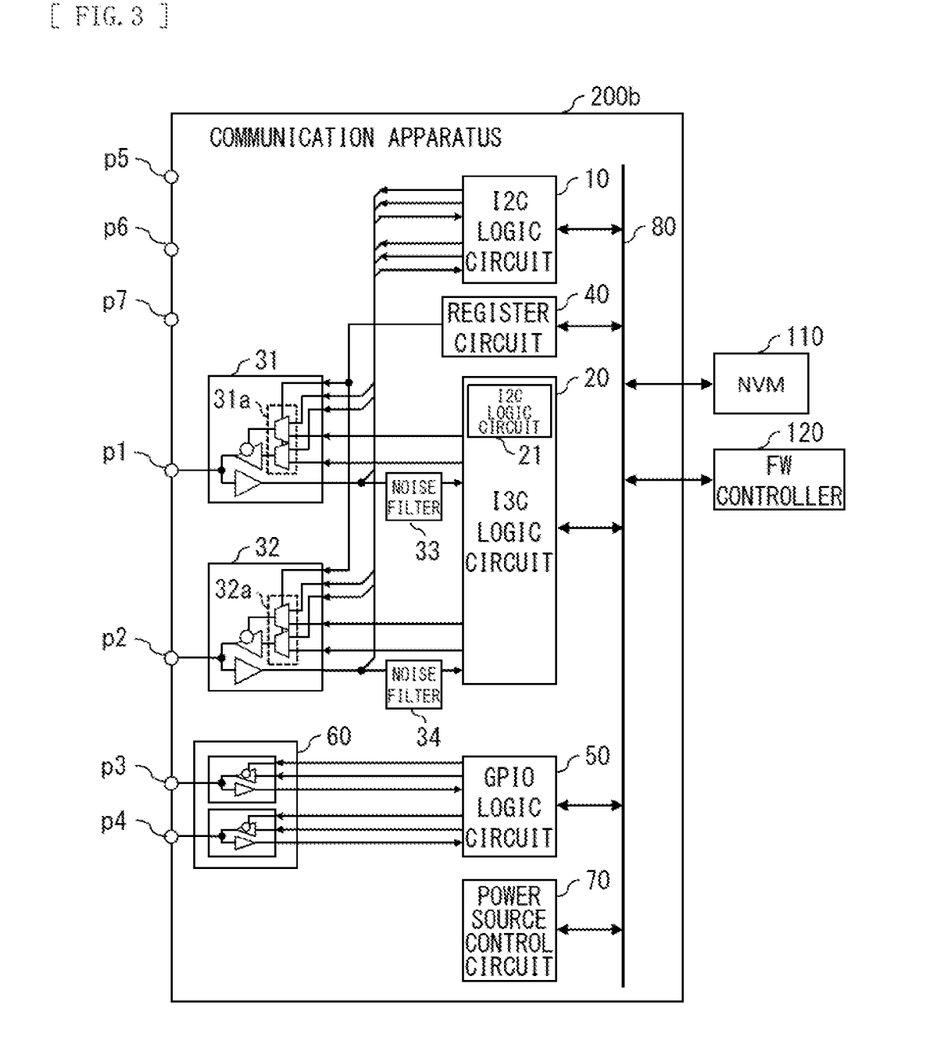
FIG. 3 is a diagram illustrating a modification of the schematic configuration of the slave provided in the image sensor in FIG. 1.

For example, as illustrated in FIG. 3, the image sensor 200 may include a non-volatile memory (NVM) 110 and a controller (a FW controller) 120 that loads and executes firmware. For example, the NVM 110 holds a state value (an NVM value) corresponding to the state value (the Reg value) stored in the register circuit 40. For example, the FW controller 120 controls data transmission in the slave 200b. For example, the FW controller 120 stores a state value read from the NVM 110 in a predetermined bit of the register circuit 40. The NVM 110 corresponds to a specific example of a "memory" of the present disclosure.

Operation

Next, operation of the slave 200b according to the present embodiment is described.

Figure 4:
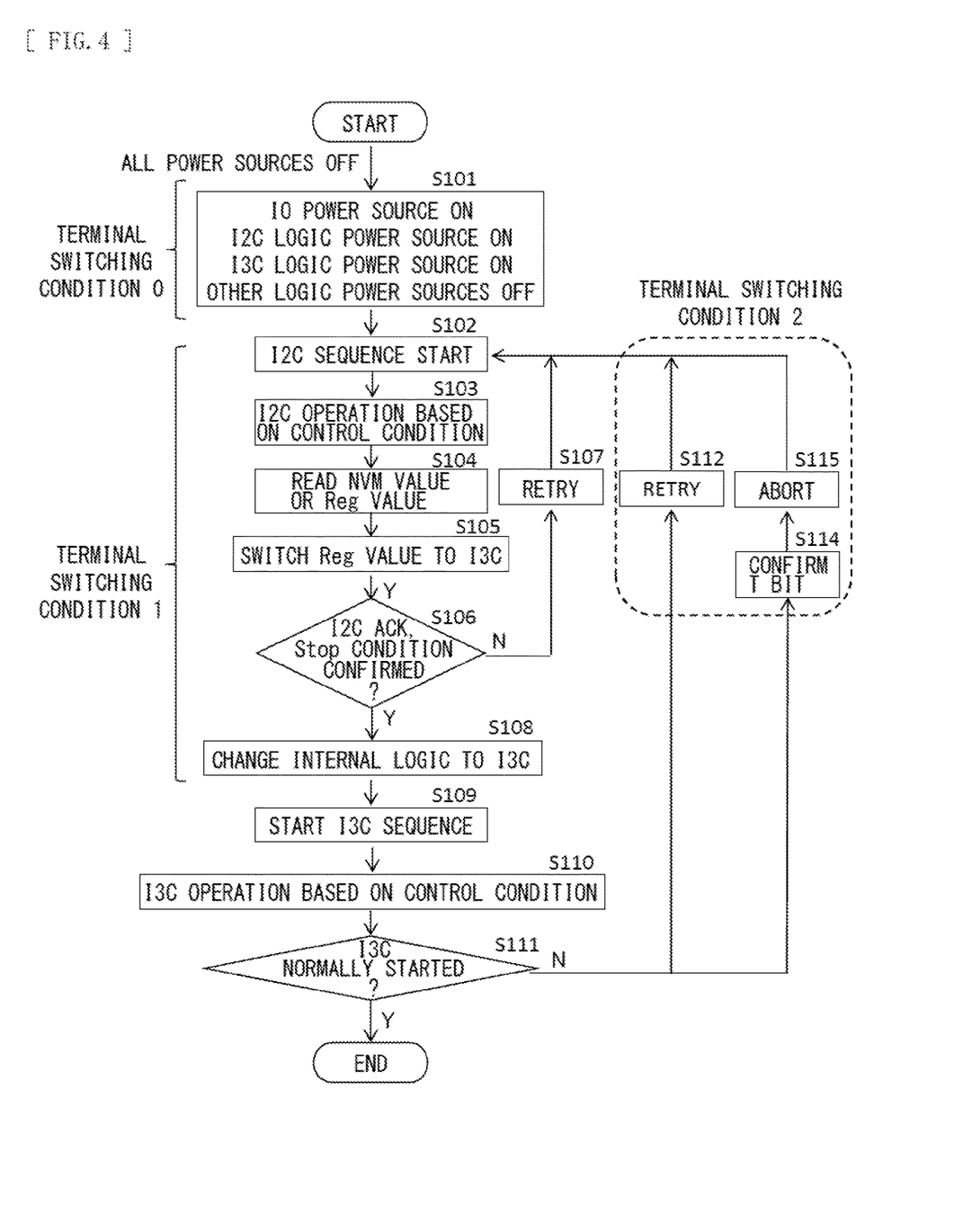
FIG. 4 is a diagram illustrating an example of a procedure of switching between two logic circuits in the slaves in FIGS. 2 and 3.

FIG. 4 illustrates an example of a procedure of switching between two logic circuits (the I²C logic circuit 10 and the I3C logic circuit 20) in the slave 200b. First, when the slave 200b detects that a predetermined signal has been supplied to the bus 80, the slave 200b instructs the power source control circuit 70 to start supplying electric power. Then, the power source control circuit 70 starts supplying electric power to the I²C logic circuit 10, the I3C logic circuit 20, the I/O circuits 31 and 32, the GPIO logic circuit 50, and the I/O circuit 60 (power on) (step S101). At this time, the power source control circuit 70 does not necessarily provide electric power to other logic circuits not illustrated in FIG. 2 (power off).

Thereafter, the slave 200b starts the I²C sequence (step S102). For example, the slave 200b instructs the I²C logic circuit 10, the I/O circuits 31 and 32, and the noise filters 33 and 34 to start the I²C sequence. Then, the I²C logic circuit 10, the I/O circuits 31 and 32, and the noise filters 33 and 34 start I²C operation in accordance with a control condition (step S103). For example, assume that the control conditions at this time are set to "open-drain configuration" and "noise filters 33 and 34 OFF". In this case, the I/O circuits 31 and 32 employ the open-drain configuration, and the noise filters 33 and 34 turn off the digital filters. When the control conditions are satisfied, the I²C logic circuit 10 starts the I²C operation.

Thereafter, the I²C logic circuit 10 reads the state value (the NVM value) from the NVM 110 or the state value (the Reg value) from the register circuit 40 (step S104). Thereafter, the I²C logic circuit 10 switches the state value (the Reg value) of the register circuit 40 from the flag A (I²C) to the flag B (I3C) (step S105).

Thereafter, the slave 200b checks whether or not the ACK and the Stop condition from the master 100b have been supplied upon the I²C sequence (step S106). When both the ACK and the Stop condition from the master 100b are confirmed upon the I²C sequence as a result (step S106; Y), the slave 200b changes an internal logic to I3C and shifts to an I3C command issuing start state (step S108). Specifically, the slave 200b instructs the switch circuit 31a to couple the I3C logic circuit 20 and the SCL terminal p1 to each other, and instructs the switch circuit 32a to couple the I3C logic circuit 20 and the SDA terminal p2 to each other. Then, the switch circuit 31a couples the I3C logic circuit 20 and the SCL terminal p1 to each other, and the switch circuit 32a couples the I3C logic circuit 20 and the SDA terminal p2 to each other. At this time, the slave 200b may instruct the power source control circuit 70 to stop power supply to the I²C logic circuit 10. In this case, the power source control circuit 70 stops the power supply to the I²C logic circuit 10.

When neither the ACK or the Stop condition from the master 100b has been confirmed upon the I²C sequence in step S106 (step S106; N), the slave 200b performs a retry (retry) from step S102 (step S107).

The slave 200b starts the I3C sequence as the internal logic is changed to I3C (step S109). For example, the slave 200b instructs the I3C logic circuit 20, the I/O circuits 31 and 32, and the noise filters 33 and 34 to start the DC sequence. Then, the I3C logic circuit 20, the I/O circuits 31 and 32, and the noise filters 33 and 34 start I3C operation in accordance with the control condition (step S110). For example, assume that the control conditions at this time are se to "push-pull configuration" and "noise filters 33 and 34 ON". In this case, the I/O circuits 31 and 32 employ the push-pull configuration, and the noise filters 33 and 34 turn on the digital filters. The I3C logic circuit 20 starts the I3C operation when the control conditions are satisfied.

Note that the control conditions at this time may be set to, for example, "open-drain configuration" and "noise filters 33 and 34 ON". In this case, the I/O circuits 31 and 32 employ the open-drain configuration, and the noise filters 33 and 34 turn on the digital filters. The I3C logic circuit 20 starts the I3C operation when the control conditions are satisfied.

The slave 200b determines whether or not the I3C sequence has been normally started (step S111). When the I3C sequence has been normally started as a result (S111; Y), the slave 200b ends the switching operation. In contrast, in a case where the I3C sequence has not been normally started (step S111; N), the slave 200b performs, for example, a retry (retry) from step S102 (step S112). Instead of step S112, the slave 200b may check, for example, whether or not a T bit (a 1-bit parity) has been supplied (step S114). In this case, when the slave 200b confirms that the T bit (the 1-bit parity) has been supplied, the slave 200b instructs to abort the I3C sequence. The 1-bit parity (T) is used in the master 100b to detect an error in the I3C sequence. The slave 200b aborts the I3C sequence (step S115) and performs step S102.

Note that the I3C logic circuit 20 may include an I²C logic circuit 21 built therein. In this case, for example, the slave 200b may instruct not the I²C logic circuit 10 but the I3C logic circuit 20 to start the I²C sequence upon starting the I²C sequence. At this time, the I3C logic circuit 20 may execute the I²C operation with use of the I²C logic circuit 21 built therein.

Figure 5:
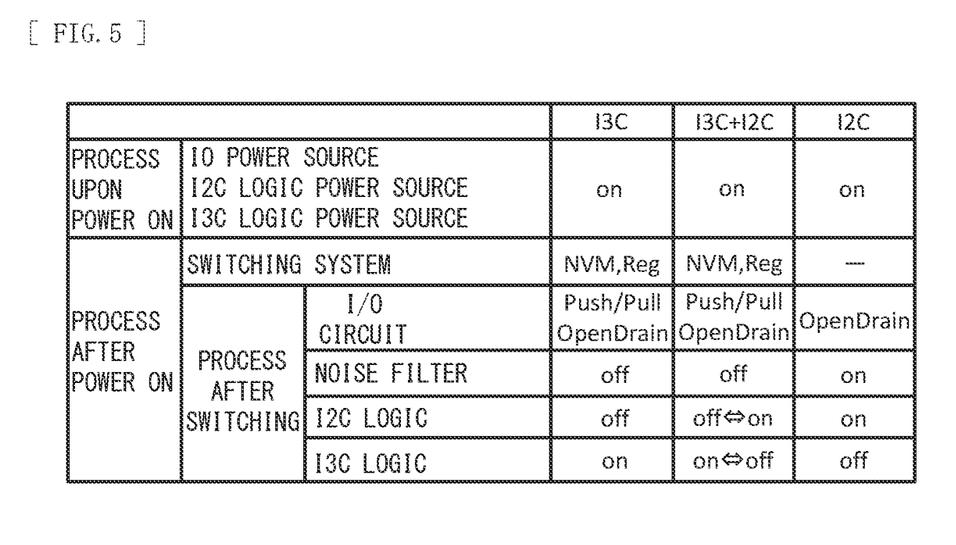
FIG. 5 is a diagram summarizing the switching between the two logic circuits in the slaves in FIGS. 2 and 3.

The switching operation described above is summarized in FIG. 5. In FIG. 5. "I3C+I²C" represents a case where the I3C logic circuit 20 executes the I3C sequence or the I²C logic circuit 21 built in the I3C logic circuit 20 executes the I²C sequence. In "I3C+I²C", the noise filters 33 and 34 always turn off the digital filters. In "I3C+I²C", when the I²C sequence is to be executed, the power of the I²C logic circuit 21 is turned on and the power of the I3C logic circuit 20 is turned off. In "I3C+I²C", when the I3C sequence is to be executed, the power of the I²C logic circuit 21 is turned off and the power of I3C logic circuit 20 is turned on.

Effects

Next, effects of the slave 200b and the communication system 1000 according to the present embodiment are described.

In the present embodiment, both the I²C logic circuit 10 and the I3C logic circuit 20 are provided, and the switch circuits 31a and 32a that control coupling between one of the I²C logic circuit 10 and the I3C logic circuit 20, and the SCL terminal p1 and the SDA terminal p2 are provided. Accordingly, it is possible to reduce the number of external terminals, as compared with a case where the SCL terminal p1 and the SDA terminal p2 are provided for each of the I²C logic circuit 10 and the I3C logic circuit 20. As a result, it is possible to achieve space saving in the communication system using both I²C and I3C.

In the present embodiment, the coupling between one of the I²C logic circuit 10 and the I3C logic circuit 20, and the SCL terminal p1 and the SDA terminal p2 is controlled on the basis of the state value (the Reg value) obtained from the register circuit 40 or the state value (the NVM value) obtained from the NVM 110. Accordingly, it is possible to omit an external terminal for switching the coupling between one of the I²C logic circuit 10 and the I3C logic circuit 20, and the SCL terminal p1 and the SDA terminal p2. As a result, as a result, it is possible to achieve space saving in the communication system using both I²C and I3C.

In the present embodiment, the coupling between one of the I²C logic circuit 10 and the I3C logic circuit 20, and the SCL terminal p1 is controlled when the ACK from the master 100b is confirmed upon the I²C sequence. Accordingly, it is possible to omit the external terminal for switching the coupling between one of the I²C logic circuit 10 and the I3C logic circuit 20, and the SCL terminal p1 and the SDA terminal p2. As a result, as a result, it is possible to achieve space saving in the communication system using both I²C and I3C.

In the present embodiment, the coupling between one of the I²C logic circuit 10 and the I3C logic circuit 20, and the SCL terminal p1 is controlled when the Stop condition from the master 100b is confirmed. Accordingly, it is possible to omit the external terminal for switching the coupling between one of the I²C logic circuit 10 and the I3C logic circuit 20, and the SCL terminal p1 and the SDA terminal p2. As a result, as a result, it is possible to achieve space saving in the communication system using both I²C and I3C.

In the present embodiment, the I3C logic circuit employs the open-drain configuration upon the I²C sequence and employs the push-pull configuration upon the DC sequence. Accordingly, it is possible to suppress vulnerability to noises caused by providing both the I²C logic circuit 10 and the I3C logic circuit 20.

In the present embodiment, the noise filter 33 is provided between the SCL terminal p1 and the I3C logic circuit 20, and the noise filter 34 is provided between the SDA terminal p2 and the I3C logic circuit 20. Accordingly, it is possible to suppress the vulnerability to noises caused by providing both the I²C logic circuit 10 and the I3C logic circuit 20.

In the present embodiment, the power supply to the I3C logic circuit 20 is turned off upon the I²C sequence and the power supply to the I²C logic circuit 10 is turned off upon the I3C sequence. Accordingly, it is possible to suppress power consumption by a circuit not in use.

In the present embodiment, the electric power supplied to the I²C logic circuit 10 and the I3C logic circuit 20 is controlled on the basis of the state value (the Reg value) obtained from the register circuit 40 or the state value (the NVM value) obtained from the NVM 110. Accordingly, it is possible to suppress power consumption by a circuit not in use while achieving space saving in the communication system using both I²C and I3C.

The present disclosure has been described above with reference to the embodiments; however, the present disclosure is not limited to the above-described embodiments and is modifiable in a variety of ways. Note that the effects described herein are mere examples. The effects of the present disclosure are not limited to the effects described herein. The present disclosure may have effects other than the effects described herein.

According to the communication apparatus of one aspect of the present disclosure and the communication system of one aspect of the present disclosure, both the I²C logic circuit and the I3C logic circuit are provided and the switch circuit that controls coupling between one of the I²C logic circuit and the I3C logic circuit, and the external terminal is provided. Accordingly, it is possible to reduce the number of external terminals, as compared with a case where an external terminal is provided for each of the I²C logic circuit and the I3C logic circuit. As a result, it is possible to achieve space saving in the communication system using both I²C and I3C.

2. Modifications

In the above-described embodiment, the image sensor 200 may be configured to switch, in accordance with switching between the I²C logic circuit and the I3C logic circuit, a system of image data supplied from the logic circuit after the switching to the master 100b of the processor 100.

Figure 6:
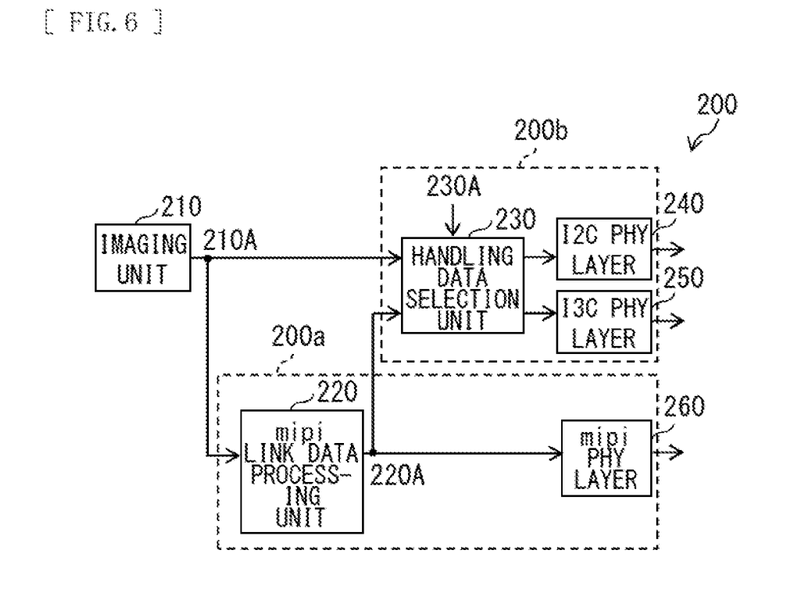
FIG. 6 is a diagram illustrating a modification of a schematic configuration of the image sensor in FIG. 1.

FIG. 6 illustrates a modification of a functional block of the image sensor 200. In the present modification, the transmitter 200a includes a mipi LINK data processing unit 220 that generates image data 220A corresponding to the transmission system of a mipi CSI-2 standard or a mipi CSI-2 successor standard on the basis of image data supplied from the imaging unit 210, and outputs the image data 220A. In the present modification, the transmitter 200a further includes a mipi PHY layer 260 that supplies the image data 220A supplied from the mipi LINK data processing unit 220 to the image data bus 600 in accordance with the mipi CSI-2 or mipi CSI-2 successor standard.

For example, the imaging unit 210 converts an optical image signal obtained through an optical lens or the like into image data. For example, the imaging unit 210 includes, for example, a CCD (Charge Coupled Device) image sensor or a CMOS (Complementary Metal Oxide Semiconductor) image sensor. The imaging unit 210 includes an analog-to-digital conversion circuit, and converts analog image data into digital image data. The imaging unit 210 acquires image data 210A by imaging, and supplies the acquired image data 210A to the transmitter 200a and the slave 200b.

In the present modification, the slave 200b includes a handling data selection unit 230, an I²C PHY layer 240, and an I3C PHY layer 250. The handling data selection unit 230 corresponds to a specific example of a "data-system switching circuit" of the present disclosure. The I²C PHY layer 240 includes the I²C logic circuit 10, the I/O circuits 31 and 32, and the I/O circuit 60. The I3C PHY layer 250 include the I3C logic circuit 20, the I/O circuits 31 and 32, the noise filters 33 and 34, and the I/O circuit 60.

The handling data selection unit 230 switches, in accordance with switching between the I²C logic circuit 10 and the I3C logic circuit 20 or switching between the I²C logic and the I3C logic in the I3C logic circuit 20, the system of image data supplied from the logic circuit after the switching. For example, the handling data selection unit 230 switches the system of image data supplied from the logic circuit after the switching, in accordance with data 230A regarding the communication standard (the I²C or I3C communication standard) of the logic circuit selected in the slave 200b. For example, in a case where the I²C sequence is selected (in a case where the data 230A indicates selection of the I²C sequence), the handling data selection unit 230 selects the image data 210A. For example, in a case where the I3C sequence is selected (in a case where the data 230A indicates selection of the I3C sequence), the handling data selection unit 230 selects the image data 220A.

The I²C PHY layer 240 supplies the image data 210A selected by the handling data selection unit 230 to the control data bus 700 in accordance with an I²C protocol. In a case where a transfer mode of the control data bus 700 is set to an SDR mode, the I²C PHY layer 240 puts the image data 210A on the SDR data (DT1, . . . , Dtn) and supplies it to the control data bus 700. In a case where the transfer mode of the control data bus 700 is set to an HDR mode, the I²C PHY layer 240 puts the image data 210A on the HDR data (HDR WDt) and supplies it to the control data bus 700. At this time, the I²C PHY layer 240 is able to put the image data 210A on the HDR data (HDR WDt) and supply it to the control data bus 700 with use of a read command from the master 100b.

The I3C PHY layer 250 supplies the image data 220A selected by the handling data selection unit 230 to the control data bus 700 in accordance with an I3C protocol. In a case where the transfer mode of the control data bus 700 is set to the SDR mode, the I3C PHY layer 250 puts the image data 220A on the SDR data (DT1, . . . , Dtn) and supplies it to the control data bus 700. In a case where the transfer mode of the control data bus 700 is set to the HDR mode, the I3C PHY layer 250 puts the image data 220A on the HDR data (HDR WDt) and supplies it to the control data bus 700. At this time, the I3C PHY layer 250 is able to put the image data 220A on the HDR data (HDR WDt) and supply it to the control data bus 700 without using the read command from the master 100b.

In the present modification, the image sensor 200 is able to switch, in accordance with the switching between the $I^2C$ logic circuit and the I3C logic circuit, the system of image data supplied from the logic circuit after the switching. Accordingly, for example, it is possible to select image data of a system appropriate for the transmission speed of the communication standard of the selected logic circuit, and supply it to the master 100b of the processor 100.

In addition, for example, the present disclosure may have the following configurations.

(1)
A communication apparatus including:
an $I^2C$ logic circuit that controls communication via a control data bus in accordance with an $I^2C$ (Inter-Integrated Circuit) communication standard;
an I3C logic circuit that controls the communication via the control data bus in accordance with an I3C (Improved Inter Integrated Circuit) communication standard;
an external terminal coupled to the control data bus; and
a switch circuit that controls coupling between one of the $I^2C$ logic circuit and the I3C logic circuit, and the external terminal.

(2)
The communication apparatus according to (1), in which the switch circuit controls the coupling on the basis of a state value obtained from a register or a memory.

(3)
The communication apparatus according to (2), in which the switch circuit controls the coupling when an ACK from a master is confirmed upon an $I^2C$ sequence.

(4)
The communication apparatus according to (3), in which the switch circuit controls the coupling when a Stop condition from the master is confirmed.

(5)
The communication apparatus according to any one of (1) to (4), in which the I3C logic circuit employs an open-drain configuration upon an $I^2C$ sequence and employs a push-pull configuration upon an I3C sequence.

(6)
The communication apparatus according to any one of (1) to (5), further including
a noise filter between the external terminal and the I3C logic circuit, in which
the noise filter is set to ON upon an $I^2C$ sequence and is set to OFF upon an I3C sequence.

(7)
The communication apparatus according to any one of (1) to (6), further including a power source control circuit that controls electric power supplied to the $I^2C$ logic circuit and the I3C logic circuit, in which
the power source control circuit turns off power supply to the I3C logic circuit upon an $I^2C$ sequence and turns off power supply to the $I^2C$ logic circuit upon an I3C sequence.

(8)
The communication apparatus according to any one of (2) to (4), further including a power source control circuit that controls electric power supplied to the $I^2C$ logic circuit and the I3C logic circuit on the basis of the state value.

(9)
The communication apparatus according to any one of (1) to (8), further including a data-system switching circuit that switches, in accordance with switching between the $I^2C$ logic circuit and the I3C logic circuit, a system of image data outputted from a logic circuit after the switching.

(10)
A communication system including:
a control data bus; and
a transmission apparatus and a reception apparatus that perform communication via the control data bus,
the transmission apparatus including
an $I^2C$ logic circuit that controls communication with the reception apparatus via the control data bus in accordance with an $I^2C$ (inter-Integrated Circuit) communication standard,
an I3C logic circuit that controls the communication with the reception apparatus via the control data bus in accordance with an I3C (Improved Inter Integrated Circuit) communication standard,
an external terminal coupled to the control data bus, and
a switch circuit that controls coupling between one of the $I^2C$ logic circuit and the I3C logic circuit, and the external terminal.

This application claims the benefit of Japanese Priority Patent Application JP2019-224480 filed with the Japan Patent Office on Dec. 12, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A communication apparatus comprising:
an $I^2C$ logic circuit that controls communication via a control data bus in accordance with an $I^2C$ (Inter-Integrated Circuit) communication standard;
an I3C logic circuit that controls the communication via the control data bus in accordance with an I3C (Improved Inter Integrated Circuit) communication standard;
an external terminal coupled to the control data bus;
a switch circuit that controls coupling between one of the $I^2C$ logic circuit and the I3C logic circuit, and the external terminal, wherein the switch circuit controls the coupling on a basis of a state value obtained from a register or a memory, controls the coupling to be to the $I^2C$ logic circuit when the state value is a first value, and controls the coupling to be the I3C logic circuit when the state value is a second value; and a power source control circuit that controls electric power supplied to the I²C logic circuit and the I3C logic circuit on a basis of the state value.

2. The communication apparatus according to claim 1, wherein the switch circuit controls the coupling when an ACK from a master is confirmed upon an I²C sequence.

3. The communication apparatus according to claim 2, wherein the switch circuit controls the coupling when a Stop condition from the master is confirmed.

4. The communication apparatus according to claim 1, wherein the I3C logic circuit employs an open-drain configuration upon an I²C sequence and employs a push-pull configuration upon an I3C sequence.

5. The communication apparatus according to claim 1, further comprising
a noise filter between the external terminal and the I3C logic circuit, wherein
the noise filter is set to ON upon an I²C sequence and is set to OFF upon an I3C sequence.

6. The communication apparatus according to claim 1, wherein the power source control circuit turns off power supply to the I3C logic circuit upon an I²C sequence and turns off power supply to the I²C logic circuit upon an I3C sequence.

7. The communication apparatus according to claim 1, further comprising a data-system switching circuit that switches, in accordance with switching between the I²C logic circuit and the I3C logic circuit, a system of image data outputted from a logic circuit after the switching.

8. A communication system comprising:
a control data bus; and
a transmission apparatus and a reception apparatus that perform communication via the control data bus,
the transmission apparatus including
an I²C logic circuit that controls communication with the reception apparatus via the control data bus in accordance with an I²C (Inter-Integrated Circuit) communication standard,
an I3C logic circuit that controls the communication with the reception apparatus via the control data bus in accordance with an I3C (Improved Inter Integrated Circuit) communication standard,
an external terminal coupled to the control data bus,
a switch circuit that controls coupling between one of the I²C logic circuit and the I3C logic circuit, and the external terminal, wherein the switch circuit controls the coupling on a basis of a state value obtained from a register or a memory, controls the coupling to be to the I²C logic circuit when the state value is a first value, and controls the coupling to be the I3C logic circuit when the state value is a second value; and
a power source control circuit that controls electric power supplied to the I²C logic circuit and the I3C logic circuit on a basis of the state value.

9. The communication system according to claim 8, wherein the switch circuit controls the coupling when an ACK from a master is confirmed upon an I²C sequence.

10. The communication system according to claim 9, wherein the switch circuit controls the coupling when a Stop condition from the master is confirmed.

11. The communication system according to claim 8, wherein the I3C logic circuit employs an open-drain configuration upon an I²C sequence and employs a push-pull configuration upon an I3C sequence.

12. The communication system according to claim 8, wherein the transmission apparatus further comprises
a noise filter between the external terminal and the I3C logic circuit, wherein
the noise filter is set to ON upon an I²C sequence and is set to OFF upon an I3C sequence.

13. The communication system according to claim 8, wherein the power source control circuit turns off power supply to the I3C logic circuit upon an I²C sequence and turns off power supply to the I²C logic circuit upon an I3C sequence.

14. The communication system according to claim 8, wherein the transmission apparatus further comprises a data-system switching circuit that switches, in accordance with switching between the I²C logic circuit and the I3C logic circuit, a system of image data outputted from a logic circuit after the switching.

* * * * *